Jan. 3, 1956    F. A. KROHM    2,728,934
CONNECTOR FOR WINDSHIELD WIPER BLADE ASSEMBLY
Original Filed April 17, 1952
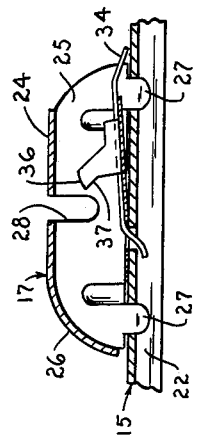
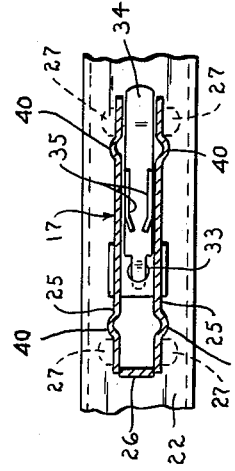
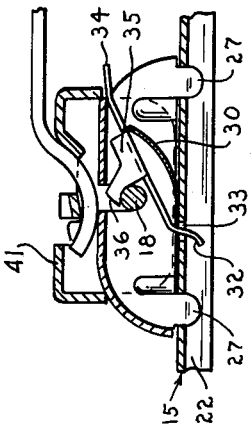
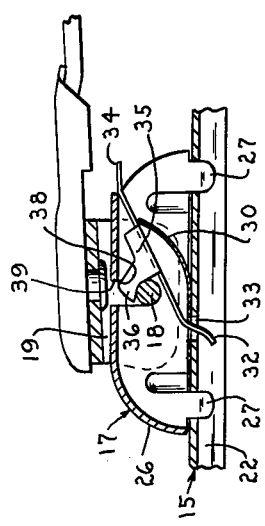
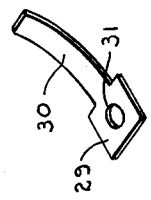
INVENTOR.
FRED A. KROHM
BY
Charles S. Penfold
ATTORNEY United States Patent Office 2,728,934
Patented Jan. 3, 1956

2,728,934

CONNECTOR FOR WINDSHIELD WIPER BLADE ASSEMBLY

Fred A. Krohm, Hobart, Ind., assignor to Productive Inventions, Inc., a corporation of Indiana Original application April 17, 1952, Serial No. 282,846. Divided and this application January 30, 1953, Serial No. 334,148

11 Claims. (Cl. 15—250)

This invention relates generally to windshield wiper apparatus and more particularly is directed to a connector on a wiper blade assembly or unit adapted for attachment to a wiper arm.

At least one form of wiper blade assembly now in use for wiping flat and/or curved surfaces of windshields comprises a blade and a pressure distributing device operatively connected to the blade. More specifically in this regard, the blade is preferably comprised of a resilient wiping element and a flexible support therefor, and the pressure distributing device preferably includes a pair of secondary yokes having their ends connected to the blade and a primary yoke or bridge means having its extremities connected to intermediate portions of the secondary. The primary yoke or bridge is provided with a connector detachably connectable with a fitting carried by a wiper arm.

A significant object of the invention is to provide the primary yoke with an improved connector for detachable connection with a wiper arm.

A specific object of the invention is to provide a connector with means for attaching it to the primary yoke in a manner whereby the central portion of the primary yoke is strengthened or reinforced.

Another object of the invention is to provide a connector comprising a housing, a latch and resilient means which are operatively associated with one another and the primary yoke in a novel manner.

A further object of the invention is to design and construct the latch in such a way that it cannot be inadvertently displaced once the blade assembly is connected to a wiper arm.

Other attributes of the invention reside in its simplicity of design and construction, economy of manufacture, durability, and efficiency of operation.

Many other objects and advantages of the invention will present itself when the description herein set forth is considered in conjunction with the drawings annexed hereto.

In the drawings:

Figure 1 is a longitudinal section taken through the central part of the primary yoke and the connector showing the latch in an operative position to hold an entering part on a wiper arm to the connector;

Figure 2 is a sectional view, similar to Figure 1, showing the latch and resilient means associated therewith in a retracted position to permit entry of an entering part carried by the wiper arm;

Figure 3 is a horizontal sectional view taken through an appropriate part of the connector showing certain details of construction;

Figure 4 is a perspective view showing the resilient means which serves to maintain the latch in an operative position;

Figure 5 is an end view of Figure 6; and

Figure 6 is a longitudinal section, similar to Figure 1, showing an adapter detachably connecting the arm part with the connector carried by the primary yoke.

This application is a division of my application Serial No. 282,846, filed April 17, 1952.

The connector 17 above referred to, which is supported on the central portion 22 of the primary yoke designated 15, will now be described. This connector is preferably made in the form of a channel housing having an outer base wall 24, parallel side walls 25, and a curved end wall 26 which is a continuation of the base wall. Each of the side walls is provided with a pair of fingers 27 which extend through rectangular holes provided therefor in the base wall of the central portion 22 of the primary yoke and are bent laterally toward the side walls of the central portion to permanently secure the housing to the yoke as illustrated in Figures 1 through 6. The connections between the connector and the primary yoke and their locations are preferably such that the shallow central portion of the yoke is reinforced to prevent buckling or distortion thereof. Since provision is made for reinforcing the central portion, the central area of the primary yoke can be made shallower in depth and if desirable the side walls of the central portion can be omitted. This setup also allows for a greater spacing between the blade and the primary yoke to permit escape of ejected snow without increasing the overall width of the blade assembly. The connections between the connector and primary yoke also prevent spreading apart of the side walls of the connector.

The housing is provided with an opening or recess 28 formed by cut-outs in the side walls and base wall. This opening is adapted to receive the entering part 18 preferably in the form of a cross-pin carried by the side walls of the wiper arm channel part 19 as mentioned above. The base of the opening or recess 28 constitutes abutment means which is engaged by the cross-pin.

The yieldable holding or locking means for detachably holding the entering part in the opening includes a latch and resilient means in the form of a leaf spring for normally maintaining the latch in a locking position as shown in Figures 1 and 6. The spring includes a square portion 29 and a curved tongue 30 as shown in Figure 4. A round aperture 31 is provided in the square portion. The inner end of the latch is provided with a hook 32 which extends through the aperture 31 and also through a similar aligned aperture 33 in the base wall of the yoke as shown in Figures 1, 2, 3 and 6 to interlock the latch and spring and the latch to the yoke. It will be noted that the square portion of the spring is of a size to be caught or anchored down between the lower marginal edges of the side walls of the housing and the yoke as shown in Figure 3 to predetermine the position of the curved tongue 30 so that only its free end will engage the outer extremity of the latch at a point remote from its inner point of connection with the yoke as shown in Figure 1.

The outer end of the latch is provided with an angularly disposed handle 34 located exteriorly of the housing so that it is readily accessible for manipulation. The latch is provided with a pair of corresponding parallel offsets 35 which impart rigidity to the latch and assist in stabilizing its movement by more or less engaging the side walls of the connector housing. Each of the offsets is formed to provide a nose portion 36 which is slightly inturned and normally obstructs the entrance to the opening 28 in the connector.

When the entering part 18 is pressed sufficiently against the nose portions the latch will be cammed inwardly to allow full entry of the entering part whereupon the latch will automatically snap outwardly to entrap the part to connect the wiper blade assembly to a wiper arm as shown in Figure 1. The inner marginal edge of each offset is preferably formed to provide a generally V-shaped notch 37 which receives the entering part as shown in Figure 6. The outer marginal edge of each offset adjacent the nose is provided with an abutment 38 which is adapted to engage the upper transverse marginal edge portion 39 of the base wall 24 as shown in Figure 1 to prevent accidental retraction of the latch when the entering part for any reason may be forced outwardly against the offsets.

Attention is directed to the fact that each of the side walls 25 or the connector housing is preferably provided with a pair of longitudinally spaced transverse depressions forming ribs 40. These ribs are located adjacent the ends of the connector and extend outwardly therefrom as clearly exemplified in Figures 1 and 3 for reinforcing the side walls of the connector. These ribs also serve to compensate for certain variations in the widths of different types of channel connector parts which are adapted for support on a wiper arm. More particularly in this regard, Figure 1 illustrates a channel arm part 19 of one type which is of a length to fit substantially between the ribs 40, whereas in Figures 5 and 6 there is shown a channel part 41 for detachably holding an arm part 19 between the part and the connector 17. The part 41 more or less straddles the connector and engages the ribs 40. The spacing between the side walls of the adapter 41 is of course greater than the spacing between the walls of the arm part 19. Thus, it will be apparent that the ribs compensate for variations in widths of certain connectors.

The latch, spring, housing and primary yoke may be assembled together in various ways but are preferably assembled by placing the housing with its open side up in a fixture, locating the latch in the housing, positioning the spring on the latch with the hook 32 of the latch projecting upwardly through the hole 31 in the spring. The primary yoke is then moved into position so that the hook 32 is caught in the aperture 33 in the yoke and the fingers 27 on the housing extend through the rectangular openings in the primary yoke, after which the fingers are bent outwardly as clearly illustrated in Figures 1 and 2 to permanently lock the housing to the yoke and the latch and spring substantially within the confines of the housing.

Having thus described my invention it will be obvious that various modifications may be made in the same without departing from the spirit of the invention, hence I do not wish to be limited in its scope other than defined in the claims appended hereto.

I claim:

1. A support, a connector carried by said support, said connector including a housing, an opening provided in the housing, a locking element and elongated resilient means, and means connecting the locking element to the support, said resilient means having an inner end caught between the housing and support and an outer end engaging the locking element at a point spaced from the connecting means for maintaining the locking element in a predetermined position for detachably securing an entering part in said opening.

2. A support member, a connector including a housing member, holes provided in one member and portions on the other member extending into the holes and bent to secure the housing member to the support, an opening provided in the housing member, an aperture provided in the support member, an elongated locking element, a hook provided on the inner end of the element caught in said aperture, means on the element spaced from its inner end for detachably holding an entering part in said opening, and resilient means connected to the element for normally maintaining the element in a predetermined locking position.

3. A support, a connector carried by said support, said connector including a housing, abutment means provided on the housing, a locking element and elongated resilient means, and means for holding the locking element for movement with respect to the support, said resilient means having an inner end interlocked with the locking element and an outer end engaging the locking element at a point spaced from the holding means for maintaining the locking element in a predetermined position for detachably securing an entering part in relation to said abutment means.

4. A support, a connector carried by said support, said connector including a housing having side walls provided with inner longitudinal marginal edges, an opening provided in the housing, and elongated resilient means having an inner end firmly secured between the marginal edges of the housing and support and an outer free end for engaging and urging a locking element in a direction for detachably securing an entering part in said opening.

5. A support, a connector carried by said support, said connector including a housing, an opening provided in the housing, a locking element and elongated resilient means, said locking element having an integral portion extending through the support, said resilient means having an inner end through which the integral portion of the locking element extends and an outer end engaging the locking element at a point spaced from the integral portion for maintaining the locking element in a predetermined position for detachably securing an entering part in said opening.

6. A support member, a connector including a housing member, holes provided in one member and portions on the other member extending into the holes and bent to secure the housing member to the support, an opening provided in the housing member, an aperture provided in the support member, an elongated locking element having means on its inner end disposed in said aperture, means on the element spaced from its inner end for detachably holding an enternig part in said opening, and resilient means secured in the housing and acting on the element for normally maintaining the element in a predetermined locking position.

7. A support member, a connector including a housing member, holes provided in one member and portions on the other member extending into the holes and bent to secure the housing member to the support, an opening provided in the housing member, elongated resilient means having an inner end secured on the support and a free end, and an elongated locking element having an inner end secured in bearing relationship on the inner end of the resilient means and an outer end supported on the free end of the resilient means for detachably holding an entering part in said opening.

8. A support, a connector carried by said support, said connector including a housing provided with an opening, an elongated spring having an inner secured end and a free end, and an elongated locking element having an inner end supported on the inner end of the spring and an outer end bearing on the free end of the spring for detachably holding an entering part in said opening.

9. A support, a connector including a housing, holes provided in the support and portions on the housing extending into the holes and bent to secure the housing to the support, an opening provided in the housing, an aperture provided in the support, an elongated locking element, a hook provided on the inner end of the element caught in said aperture, means on the element spaced from its inner end for detachably holding an entering part in said opening, and resilient means acting on the element for normally maintaining the element in a predetermied locking position.

10. A support, a connector carried by said support, said connector including a housing, abutment means provided on the housing, a locking element and resilient means, and means for holding the locking element for movement with respect to the support, said resilient means having a portion interlocked with the locking element and a portion for engaging the locking element at a point spaced from the holding means for maintaining the locking element in a predetermined position for detachably securing an entering part in relation to said abutment means.

11. A support having a base wall, a connector carried by said support, said connector comprising a housing having side walls, an opening provided in the housing, and elongated yieldable means disposed between the side walls and having an inner end pivotally secured to the base wall of the support and an outer end for detachably securing an entering part in said opening.

References Cited in the file of this patent

UNITED STATES PATENTS

| | | |
|---|---|---|
| 2,432,693 | Anderson | Dec. 16, 1947 |
| 2,548,090 | Anderson | Apr. 10, 1951 |
| 2,643,410 | Nesson | June 30, 1953 |